US012597326B2

(12) United States Patent
Yamayoshi et al.

(10) Patent No.: US 12,597,326 B2
(45) Date of Patent: Apr. 7, 2026

(54) MANAGEMENT AND SECURITY ALERT SYSTEM AND SELF-SERVICE RETAIL STORE INITIALIZATION SYSTEM

(71) Applicant: VisionX LLC, San Jose, CA (US)

(72) Inventors: Mamoru Yamayoshi, Newman, CA (US); Liang Diao, Shenzhen (CN); Zhuohang Jiang, Guangzhou (CN); Minghao Zhou, Brooklyn, NY (US); Zhuoying Zhou, Boston, MA (US); Haisong Gu, Cupertino, CA (US); Yingqiang Liu, Chandler, AZ (US)

(73) Assignee: VisionX LLC, San Jose, CA (US)

( * ) Notice: Subject to any disclaimer, the term of this patent is extended or adjusted under 35 U.S.C. 154(b) by 0 days.

(21) Appl. No.: 18/920,136

(22) Filed: Oct. 18, 2024

(65) Prior Publication Data

US 2025/0131805 A1      Apr. 24, 2025

Related U.S. Application Data

(60) Provisional application No. 63/591,557, filed on Oct. 19, 2023.

(51) Int. Cl.
*G08B 13/196*        (2006.01)
*G06Q 10/087*        (2023.01)
(Continued)

(52) U.S. Cl.
CPC ..... *G08B 13/19608* (2013.01); *G06Q 10/087* (2013.01); *G06V 10/82* (2022.01);
(Continued)

(58) Field of Classification Search
None
See application file for complete search history.

(56) References Cited

U.S. PATENT DOCUMENTS 10,043,360 B1     8/2018  Mullins
10,186,124 B1 *   1/2019  Mullins ............ G08B 13/19613
(Continued)

FOREIGN PATENT DOCUMENTS

CN        109918959 A  *  6/2019
CN        115037856 A     9/2022
(Continued)

OTHER PUBLICATIONS

Translation EP 3940614 (Year: 2022).*

*Primary Examiner* — Ricky Chin
(74) *Attorney, Agent, or Firm* — Maier & Maier, PLLC

(57)        ABSTRACT

A management and security alert system with a first store management and anti-theft subsystem include: a merchandise status monitoring module for monitoring in real time whether any merchandise leaves a shelf in the retail store, locating the merchandise leaving the shelf, based on a live video stream captured by cameras in the retail store, and recording the merchandise leaving the shelf as the off-shelf merchandise; a Re-id human detecting and tracking module for detecting in real time whether there is a new customer entering the retail store, assigning every new customer with a unique ID number and assigning the off-shelf merchandise to the ID number of the customer who has the closest distance from the off-shelf merchandise; and an alarm generating module that sends an alert when the Re-id human detecting and tracking module detects that a customer in the retail store approaches a store exit a with unpaid merchandise.

14 Claims, 5 Drawing Sheets

11

(51) Int. Cl.

| | |
|---|---|
| *G06V 10/82* | (2022.01) |
| *G06V 20/52* | (2022.01) |
| *G06V 40/10* | (2022.01) |
| *G06V 40/20* | (2022.01) |

(52) U.S. Cl.
CPC .............. *G06V 20/52* (2022.01); *G06V 40/10* (2022.01); *G06V 40/28* (2022.01); *G08B 13/1961* (2013.01)

(56) References Cited

U.S. PATENT DOCUMENTS

| | | | |
|---|---|---|---|
| 10,497,231 B2 | 12/2019 | Mullins | |
| 11,682,277 B2 | 6/2023 | Mullins | |
| 2012/0169500 A1* | 7/2012 | Stern ................. | G08B 13/2402 340/572.1 |
| 2014/0019241 A1* | 1/2014 | Treiser ............... | G06Q 30/0609 705/26.35 |
| 2016/0110703 A1* | 4/2016 | Herring ................. | G06V 40/16 705/23 |
| 2017/0245237 A1* | 8/2017 | Thompson ............. | H04W 4/80 |
| 2018/0096331 A1* | 4/2018 | Patil .................... | G08B 13/246 |
| 2019/0156082 A1* | 5/2019 | Berg ..................... | G06Q 10/08 |
| 2019/0221083 A1* | 7/2019 | Grant ................ | G08B 21/0277 |
| 2019/0279382 A1* | 9/2019 | Jiang ..................... | G06T 17/00 |
| 2020/0211154 A1* | 7/2020 | Ng ....................... | A61B 5/1128 |
| 2020/0258070 A1* | 8/2020 | Fujisawa ............. | G06Q 20/208 |
| 2020/0344409 A1* | 10/2020 | Bermejo Fernandez ................... | H04N 23/611 |
| 2021/0103742 A1* | 4/2021 | Adeli-Mosabbeb ... | G06V 40/10 |
| 2021/0183212 A1* | 6/2021 | Wen ..................... | G07G 1/0063 |
| 2021/0312236 A1* | 10/2021 | Goncharov ........... | G06V 40/23 |
| 2021/0312424 A1* | 10/2021 | Lee .................... | G06Q 20/3825 |
| 2022/0307231 A1* | 9/2022 | Hunsballe ........... | G05D 1/2285 |
| 2023/0048304 A1* | 2/2023 | Nooteboom .......... | B60W 50/06 |
| 2023/0068152 A1* | 3/2023 | Goldman ............... | H04W 4/33 |
| 2023/0085518 A1* | 3/2023 | Chen ......................... | G06T 7/70 382/103 |
| 2023/0386072 A1* | 11/2023 | Yao ......................... | G06T 7/251 |
| 2024/0046701 A1* | 2/2024 | Park ..................... | G06V 10/764 |
| 2024/0062387 A1* | 2/2024 | Frantz ................ | G02B 27/0172 |
| 2024/0123288 A1* | 4/2024 | Barbalinardo ....... | G06V 10/764 |
| 2024/0221205 A1* | 7/2024 | Wang ........................ | G06T 7/73 |
| 2024/0221207 A1* | 7/2024 | Kwon ..................... | G06V 20/20 |
| 2024/0221260 A1* | 7/2024 | Dinev ..................... | G06T 13/40 |
| 2024/0321049 A1* | 9/2024 | Idris ..................... | A63F 13/655 |
| 2025/0086811 A1* | 3/2025 | Meftah ................... | G06T 7/292 |
| 2025/0131805 A1* | 4/2025 | Yamayoshi .......... | G08B 29/186 |

FOREIGN PATENT DOCUMENTS

| | | | | | |
|---|---|---|---|---|---|
| EP | 3940614 A1 | * | 1/2022 | ............. | G06Q 30/06 |
| FR | 3112467 A1 | * | 1/2022 | .......... | G07G 1/0072 |
| JP | 2004514975 A | * | 5/2004 | ............. | G16H 40/67 |
| KR | 102086957 B1 | * | 5/2020 | ............. | G06Q 10/10 |
| WO | WO-2023039677 A1 | * | 3/2023 | ............... | G06T 7/70 |

\* cited by examiner

10

11

21

213

30

MANAGEMENT AND SECURITY ALERT SYSTEM AND SELF-SERVICE RETAIL STORE INITIALIZATION SYSTEM

TECHNICAL FIELD

The described embodiments relate generally to a management and security alert system and a self-service retail store initialization system, and more particularly to the management and security alert system used in retail stores.

BACKGROUND

Management and security are always the main concerns for retail stores including, but being not limited to, supermarkets, shopping malls, convenience stores, and self-service stores. AI technology and computer science have been widely used in monitoring and/or managing commodities and customers in retail stores for improving the efficiency of management and for providing more precise alerts. Different monitoring or anti-theft systems have been developed based on machine learning technology and are used in stores to monitor the stores and produce alerts when abnormal events happen. For example, AI guardsman, a machine learning system, uses computer vision and deep learning to catch shoplifters. AI guardsman relies on an open-source technology and scans live video streams collected by cameras in convenience stores and supermarkets, to track every customer inside. When it detects suspicious activity, for example, when a would-be thief starts looking for blind spots or begins nervously checking their surroundings, the system sends an alert to a store clerk's smartphone with the person's mugshot and location. However, this system can't produce warnings for a suspicious person before an actual theft occurs. EasyCVR, another monitoring and alert system, can capture videos in a store, monitor humans and objects in the video, and apply an AI smart detection to alert users of any abnormal situations. However, the architecture for object tracking used by EasyCVR needs to be improved, in order to provide faster inference speed and higher precision of capturing human in a video stream. OpenPose, a real-time and multi-person detection system, jointly detect human body, hand, facial, and foot keypoints (in total 135 keypoints) on single images. However, this system is not good at predicting complex behaviors.

SUMMARY

A purpose of the present disclosure is to provide a management and security alert system to solve the above problems. The management and security alert system may monitor in real time a retail store to provide the retailer with an opportunity to make smarter decisions about sales, marketing, staffing, security and more. The system may monitor in real time a merchandise status in a store to prevent thefts, and detect in real time suspicious behaviors, for example shoplifting, with a stick-figure human detection and pose estimation technique. The system may also warn suspicious customers and remind staff in the store of possible thefts before they actually occur. By combining both human behavior analysis and merchandise status monitoring, the system may guarantee a more accurate detection of suspicious behaviors.

Another purpose of the present disclosure is to provide a self-service retail store initialization system which may be combined and implemented with the management and security alert system to accommodate automated store management in self-service retail stores.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

As required, detailed embodiments of the present disclosure are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to interpreted as limiting, but merely as a representative basis for teaching one skilled in the art to variously employ the present invention.

Figure 1:
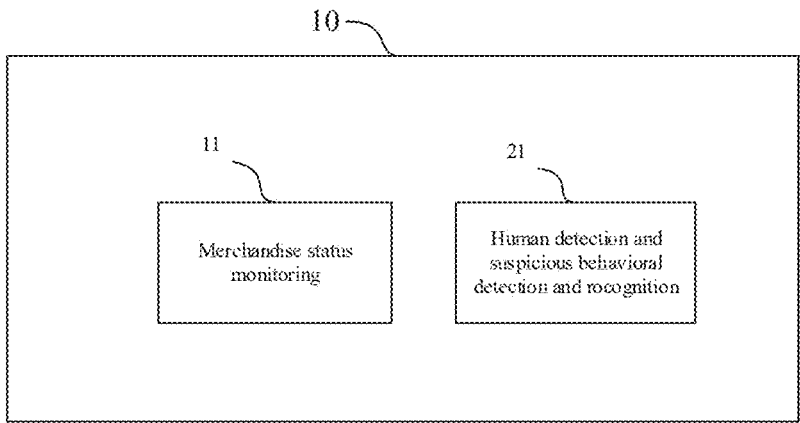
FIG. 1 shows a schematic framework of an example of the management and security alert system, in according with some embodiments of the present disclosure.

FIG. 1 shows a schematic framework of the management and security alert system, in according with some embodiments of the present disclosure. With reference to FIG. 1, the management and security alert system 10 may include a first store management and anti-theft subsystem 11 based on monitoring and tracking the status of merchandise and a second store management and anti-theft subsystem 21 based on human detection and suspicious behavioral detection and recognition. The first store management and anti-theft subsystem 11 may monitor a merchandise status in a retail store, including monitoring the status of commodities leaving shelves in the retail store for store management and security. The second store management and anti-theft subsystem 21 may detect and recognize suspicious behaviors of customers in the retail store, based on a stick-figure-based human detection technology. Further, the second store management and anti-theft subsystem 21 may implement a training acceleration mechanism based on matrices multiplication and Einstein Summation and speed up a back-propagation process. The second store management and anti-theft subsystem 21 may also use an additional copy of features to prevent information loss during the training. The second store management and anti-theft subsystem 21 may also implement a model architecture to down sample temporal features and to learn long-term temporal features of images.

Figure 2:
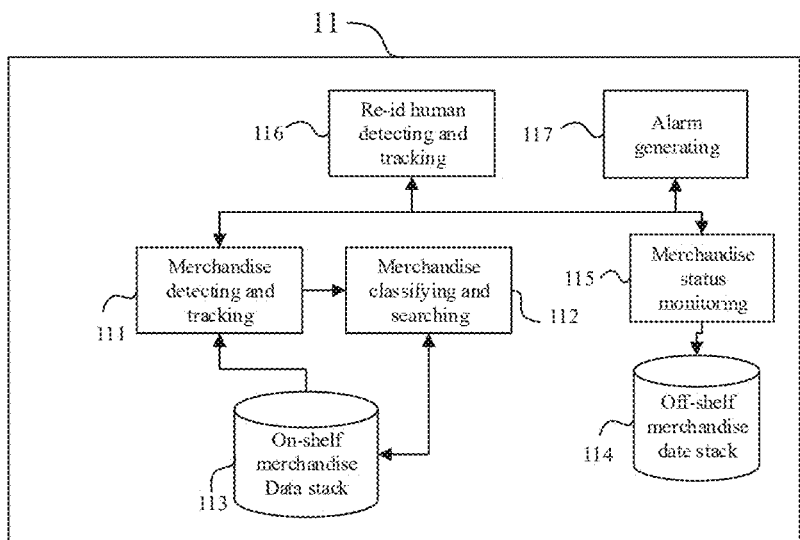
FIG. 2 shows a schematic framework of an example of the store management and anti-theft subsystem based on monitoring and tracking the status of merchandise, in according with some embodiments of the present disclosure.

FIG. 2 shows a schematic framework of the first store management and anti-theft subsystem based on monitoring and tracking the status of merchandise, in according with some embodiments of the present disclosure. The store management and anti-theft sub-system 11 may track and monitor a merchandise status in a retail store which includes, but is not limited to, a convenience store, a grocery store, a supermarket, a shopping mall, or a self-service store. With reference to FIG. 2, in some embodiments, the first store management and anti-theft subsystem 11 may include a merchandise detecting and tracking module 111 for tracking the merchandise status in the retail store, a merchandise classification and search module 112 for classifying the merchandise in the retail store and searching its belonged category, an on-shelf merchandise data stack 113 for storing information of available merchandise on shelves in the retail store, an off-shelf merchandise data stack 114 for storing information of merchandise leaving the shelves, and a merchandise status monitoring module 115 for monitoring a real-time status of the merchandise. The real-time status may include an on-shelf status and an off-shelf status. The first store management and anti-theft subsystem 11 also includes a Re-id (Re-identification) human detecting and tracking module 116. The module 116 uses an algorithm of object tracking-by-detection to detect and track in-store customers. The module 116 also assigns every customer in the retail store with a unique ID number and assigns the off-shelf merchandise to the customer ID of a customer who has the closest distance from the off-shelf merchandise. The first store management and anti-theft subsystem 11 may also include an alarm generating module 117.

The Re-id human detecting and tracking module 116 detects in real time whether there is a customer entering the store, based on real-time videos of all entrances of the store captured by one or more cameras. When no new customer is entering the store, the merchandise detecting and tracking module 111 detects all shelves of the store using real-time pictures or live video streams of all shelves of the store captured by cameras in the store, to determine the stock in the store under a static condition. The result of the stock is sent to the merchandise classification and search module 112, and the module 112 searches a category for each commodity contained in the stock and then classifies the commodity with the category. The on-shelf merchandise data stack 113 is then updated with the current status of the commodity from the module 112. The current status may include a bounding box of the current commodity and its category.

When it is confirmed that one or more new customers are entering the store, the module 116 will assign each new customer with a unique ID, for example, ID=1. In the meantime, the on-shelf merchandise data stack 113 will be locked and postpone its update. After one or more new customers enter the store, the merchandise detecting and tracking module 111 keeps checking the status and locations of all the merchandise in real time and compares the monitored status of each commodity with the status of the commodity in the on-shelf merchandise data stack 113. Based on the Hungarian algorithm, the module 111 finds the shortest distance of matching the monitored status and the status in the data stack 113.

The merchandise status monitoring module 115 monitors in real time whether any merchandise leaves the shelf. When any merchandise leaves the shelf, the merchandise status monitoring module 115 will record the status of the merchandise as the off-shelf status. Accordingly, the status of merchandise recorded in the module 115 will be different from the status of the merchandise recorded in the module 113. The module 115 will locate the merchandise leaving the shelf, and the off-shelf merchandise data stack 114 will be updated with the information of the merchandise leaving the shelf. The Re-id human detecting and tracking module 116 will assign the merchandise leaving the shelf to the customer whose distance is the closest from the merchandise leaving the shelf. This distance may be also determined based on the Hungarian algorithm.

When the merchandise detecting and tracking module 111 tracks any returned merchandise to the shelf, and the category of the returned merchandise matches the information stored in the off-shelf merchandise data stack 114, both the on-shelf merchandise data stack 113 and the off-shelf merchandise data stack 114 will be updated with the returned merchandise, that is, the on-shelf merchandise data stack 113 will record the information of the returned merchandise, and the off-shelf merchandise data stack 114 may mark that the merchandise has been returned.

When the customer reaches the counter and check out all the merchandise under his/her ID, the off-shelf merchandise data stack 114 will be updated with the checked-out merchandise which is marked as "transaction complete". If the customer approaches a store exit and there is still unpaid merchandise recorded under his/her ID, the alarm generating module 117 will send out an alert. The Re-id human detecting and tracking module 116 can be used to detect and track that the customer reaches the counter and the customer approaches a store exit. The alert may be sent to a staff in the store via a phone, or to a monitor, or directly to the customer.

Figure 3:
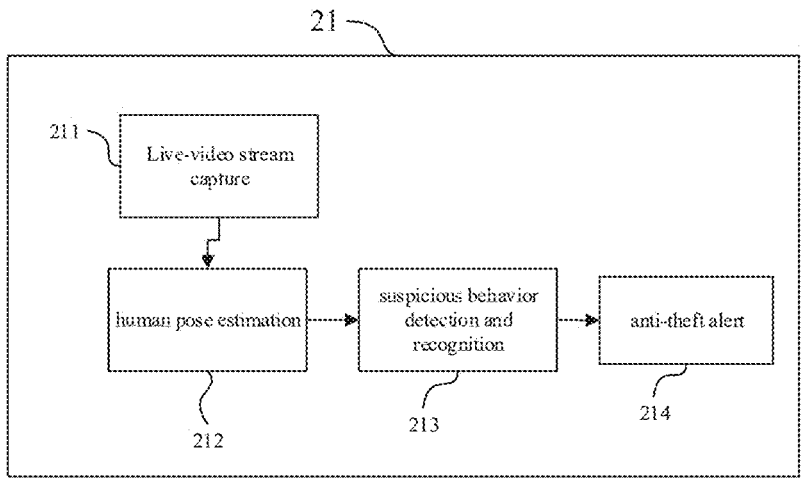
FIG. 3 shows a schematic framework of an example of the store management and anti-theft subsystem based on human detection and suspicious behavioral detection and recognition, in according with some embodiments of the present disclosure.

FIG. 3 shows a schematic framework of the second store management and anti-theft subsystem based on human detection and suspicious behavioral detection and recognition, in according with some embodiments of the present disclosure. With reference to FIG. 3, the second store management and anti-theft subsystem 21 performs a human detection and a suspicious behavioral detection and recognition. As shown in FIG. 3, in some embodiments, the second store management and anti-theft subsystem 21 may include a video capture module 211 for capturing live video streams in the store, a human pose estimation module 212 which may predict and estimate human behaviors based on the captured live video streams, a suspicious behavior detection and recognition module 213 which may detect and recognize suspicious behaviors based on the predicted and estimated human behaviors, and an anti-theft alert module 214 which may set out alerts when suspicious behaviors are recognized.

The video capture module 211 may be a smart camera fixedly mounted in the store, or a camera carried by a movable robot in the store. The camera may monitor the store in real time and capture live video streams in the store with a high-accuracy 3D information.

The human pose estimation module 212 receives the captured video streams from the video capture module 211 and uses the video streams to make predictions of human pose and movements, based on neural networks. The neural networks may include, but be not limited to, open-source deep learning platforms. For example, the open-source deep learning platforms may include TensorFlow and PyTorch.

Figure 4:
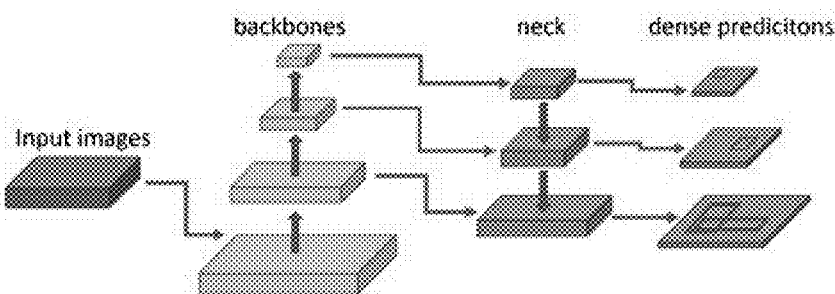
FIG. 4 is an example architecture of a convolutional neural network used by the human poses estimation module, in according with some embodiments of the present disclosure.

FIG. 4 is an example architecture of a convolutional neural network used by the human pose estimation module, in according with some embodiments of the present disclosure. With reference to FIG. 4, in some embodiments, the human pose estimation module 212 may use a convolutional neural network that includes an input layer of images, a backbone network layer for feature extraction, a neck network layer, and a head layer that may output dense predictions.

The convolutional neural network may include, but be not limited to, OpenPose, PoseNet, ResNet-50, and Darknet53, which all belong to deep neural networks (DNN). In some embodiments, ResNet-50 or Darknet53 are pre-trained with parameters and used as the backbone network for feature extraction to achieve a higher detection accuracy. After the feature extraction, the feature maps from different backbone layers are input into the neck network layer for further analysis. For example, the neck network layer may convert the extracted feature maps from the backbone network into a compressed form, that is, a lower dimensional representation of the extracted feature maps. The neck network layer may also aid in discarding the redundant features from the extracted feature maps. This step improves the ability of the deep neural networks to compute positions of the same objects across different resolutions more precisely. Additionally, this neck network layer is capable of simultaneously recognizing larger objects in high-precision images and smaller objects in low-precision images. After being processed by the neck network layer, an auxiliary head at different layers will be precomputed to assist predictions of lead head at last layer, which enables a coarse-to-fine training of the model. During the training epochs, the loss function would be calculated based on three parts: localization loss, confidence loss, and classification loss, and these losses will be compared with the annotations of real data. On the inference stage or model deployment, the data format is reshaped, and the original grid coordinates are resized accordingly to complete the detection task.

Figure 5:
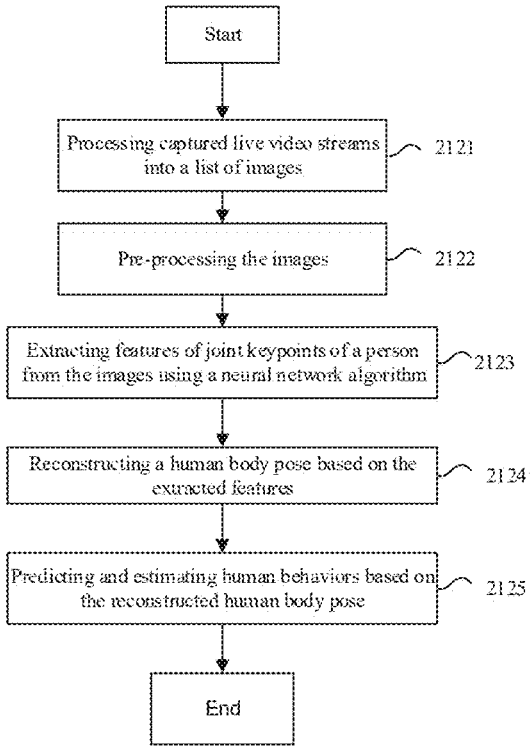
FIG. 5 is a flowchart of an example of a human pose estimation method performed by the human poses estimation module, in according with some embodiments of the present disclosure.

FIG. 5 is a flowchart of an example of a human pose estimation method performed by the human pose estimation module, in according with some embodiments of the present disclosure. With reference to FIG. 5, after the human poses estimation module 212 receives the captured video streams by the video capture module 211, the video streams are first processed to separate them into a list of images (step 2121). The images may then be pre-processed (step 2122). The pre-processing of the images may include, but be not limited to, noise removal, resizing, image enhancement, and so on.

The pre-processed images then are each input into the neural network algorithm for extracting features of joint keypoints of a person (step 2123). The neural network algorithm may include, but be not limited to, ResNet-50 and Darknet53. The features of joint keyjoints may include location information of the joint keypoints, for example, for tracking movement of hands of a person in the store and for predicting whether the person is taking or trying to hide an object.

After the feature extraction, the feature maps from different backbone layers are input into the neck network layer to use the extracted features of joint keypoints to reconstruct a human body pose based on a tree-based pose reconstruction technique (step 2124). Then the reconstructed human body pose is input to the auxiliary head at different layers for being precomputed to assist predictions of lead head at last layer. The lead head may output predicted and/or estimated human behaviors based on the reconstructed human body pose (step 2125) which may include every customer's pose and behavior information.

The suspicious behavior detection and recognition module 213 may predict and recognize customer behaviors based on the pose and behavior information output from the human pose estimation module 212. Based on the pose and behavior information, the module 213 may track movement of hands of a person in the store and predict whether the person is taking or trying to hide an object. In some embodiments, the module 213 may use deep learning algorithms of graph convolution neural network (GCNN/GCN) to predict and recognize human activities. Then, the module 213 may predict the intention of the behaviors based on deep learning algorithms for preventing thefts or shopliftings. The module 213 may also use machine learning classification algorithms to classify behaviors. The classification algorithms may include SVM, Random Forest, etc., Based on these trained algorithm models, the module 213 may classify the behaviors like taking an object, putting back the object, putting the object into personal pocket, etc.

Figure 6:
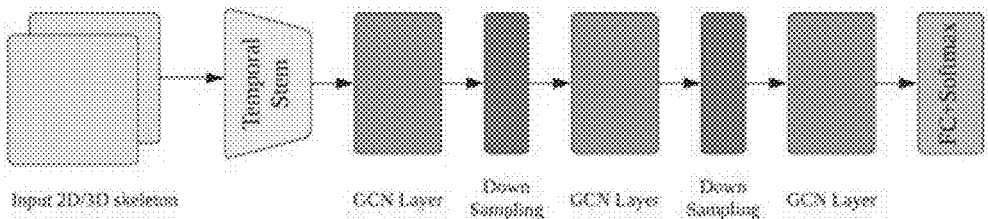
FIG. 6 is an example architecture of the graph convolution neural network for classifying human activities, in according with some embodiments of the present disclosure.

FIG. 6 is an example architecture of the graph convolution neural network for classifying human activities, in according with some embodiments of the present disclosure. With reference to FIG. 6, in some embodiments, the graph convolution neural network may include an input layer of 2D/3D skeleton, a temporal stem layer, three GCN layers, two down sampling layers each of which is located between two adjacent GCN layers, and a fully connected layer. The Softmax function layer may be used as the activation function for the fully connected layer.

Based on the principle of previous GCNs, the overall architecture of the network contains 3 layers of training layer, and a down sampling layer each in between. The first stem layer is used to change input features to appropriate features by down sampling, but in typical GCNs, the temporal features are usually used directly without stem. This limits the distance between the temporal information, reduces the ability to learn long-term temporal features. By using a temporal down sampling stem layer after the input, it may give the model the ability to learn long-term information, which creates benefits in retail store surveillance scenarios.

An adjacency matrix used in the GCN is a N-by-N trainable matrix, where N denotes the number of nodes in the input and represents relationships across all the nodes. Most GCN uses 3 copies of input and 3 adjacency matrices to train the GCN model. The matrices include outward, inward, and self-relationships among the nodes. In the training process, there are situations where information of the node itself is lost in matrix multiplication. In order to avoid these scenarios, according to some embodiments, one more copy of the input is added, that is, totally 4 copies of input, and this one more copy is simply concatenated with other results without multiplying with any adjacency matrix. This measure can keep node information as much as possible, which will increase the accuracy of model.

During a graph convolution, there will be a lot of matrices multiplications. In this process, the backpropagation contained in the process takes a long time to calculate. In order to optimize this process, according to some embodiments, the following algorithm is provided to accelerate the training process of model and the training time will be greatly shortened.

Matrices multiplications can be represented as Einstein Summation:

$$Y = ein\text{sum}(VUk, NCTVk \rightarrow NCTUk, A, X),$$

where A is the adjacency matrix, X is the input vector, and the first parameter represents dimensions of A, X, and output. To optimize differentiation, let A' be N copies of A, which makes its dimension NVUk, let $$Y' = ein\text{sum}(NVUk, NCTVk \rightarrow NCTUk, A', X),$$

it may be shown that $Y'=A'X=[A'_1X_1, A'_2X_2, \ldots, A'_NX_N]$ $=[AX_1, AX_2, \ldots, AX_N]=AX=Y$. Since A is trainable, it may be shown that $$\frac{\partial Y'}{\partial A} = \frac{\partial A'X}{\partial A} = \frac{1}{N}\sum_{i=1}^{N}\frac{\partial A'_i x_i}{\partial A_i} = \frac{1}{N}\sum_{i=1}^{N}\frac{\partial A_i x_i}{\partial A_i} = \frac{\partial AX}{\partial A} = \frac{\partial Y}{\partial A}.$$

Then it may be concluded that Y and Y' are equivalent in training process. Because in the parallel computing of matrix elements, computing the gradient of Y' is faster than Y, using Y' and matrix A' in the training process will result in shorter time.

Figure 7:
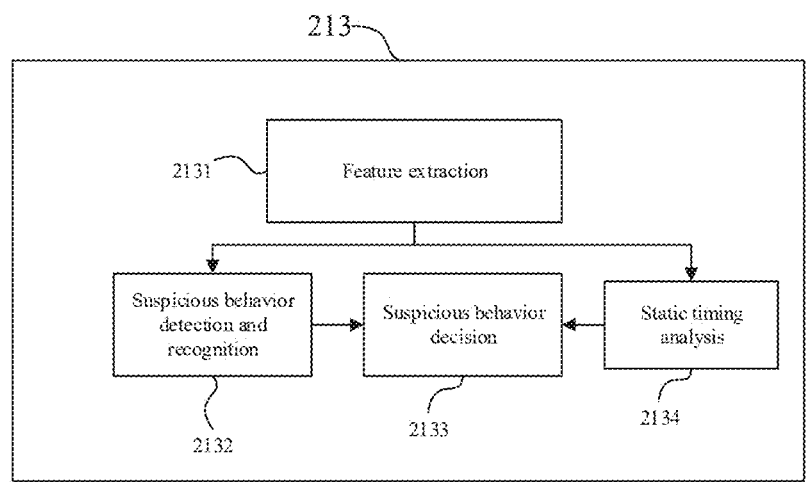
FIG. 7 shows a schematic framework of an example of the suspicious behavior detection and recognition module, in according with some embodiments of the present disclosure.

FIG. 7 shows a schematic framework of an example of the suspicious behavior detection and recognition module, in according with some embodiments of the present disclosure. With reference to FIG. 7, in some embodiments, the suspicious behavior detection and recognition module 213 may include a feature extraction module 2131, a suspicious behavior detection and recognition module 2132, a suspicious behavior decision module 2133, and a static timing analysis module 2134.

In some embodiments, the feature extraction module 2131 may use a neural-network-based pose estimation model to obtain behavior information of a person in the store. The behavior information is used to track movements of the person, for example, the movement of the person's hands, for predicting whether the person is taking or trying to hide an object.

In some embodiments, the suspicious behavior detection and recognition module 2132 may detect and classify customer behaviors. The module 2132 may also recognize and classify behaviors of a customer in the store, like taking/moving the merchandise from shelf, trying to hide in the pockets, etc.

In some embodiments, the suspicious behavior decision module 2133 may provide a customized definition of suspicious behaviors and thefts and define suspicious behaviors based on scoring. The module 2133 may compute a suspicious behavior score for each customer. The behaviors of such customer will be classified and detected as suspicious if the score exceeds the default threshold value. For example: count 1 score for unusual hand movements, gestures, or facial expressions, 1 score for repeatedly taking merchandise from the same shelf, 3 scores for trying to hide the merchandise, 3 scores for putting the merchandise in his/her bag or clothes, etc.

In some embodiments, the static timing analysis module 2134 may use a smart camera to supervise the store and obtain a sequence of timed data/information. For example, information like the location and movements of the same customer at different time is collected. Based on the static timing analysis, the chronological order of several events and their correlations is analyzed and sorted out. The suspicious behavior decision module 2133 uses the result from the static timing analysis module 2134 to analyze and predict an "intention score" of each customer. The "intention score" represents the intention of customer behaviors. The higher the score is, the supervised customer will be more inclined to be involved in theft and will be marked as suspicious. The static timing analysis module 2134 will determine several key factors that are used to define suspicious behaviors, including the time order of noticed behaviors/events, the duration of ongoing behavior/event, and the correlation of suspicious events and more. The static timing analysis module 2134 may accumulate the "intention score" to each customer. Once the score exceeds the default threshold value, and the system 21 will be alerted. Unlike the suspicious behavior score, which works more like a confidence score of an incurred event, the "intention score" is a prediction of the unwanted event that has not happened yet. The combination of the two decision scores will let the system 21 detect and recognize suspicious behaviors in a more efficient and accurate way.

The anti-theft alert module 214 receives the input from the suspicious behavior detection and recognition module 213 and decides whether to generate an alert or alarm. In some embodiments, the anti-theft alert module 214 may classify the detected suspicious events into different risk classes and prioritize the task with the highest risk level. The module 214 may ask for a cloud assistance to minimize false alarms.

Figure 8:
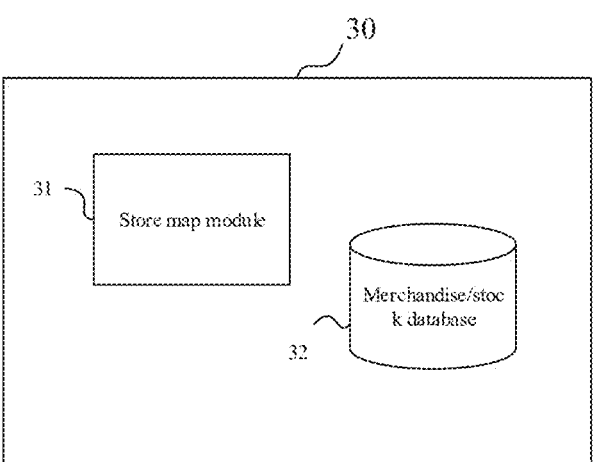
FIG. 8 shows a schematic framework of an example of the self-service retail initialization system, in according with some embodiments of the present disclosure.

FIG. 8 shows a schematic framework of an example of the self-service retail initialization system, in according with some embodiments of the present disclosure. The self-service retail initialization system 30 may include a store map module 31 and a merchandise/stork database 32. A store map includes two parts: a free space map which is an AGV-accessible route map; and a shelves Map which records 3D model of the shelves.

Figure 9:
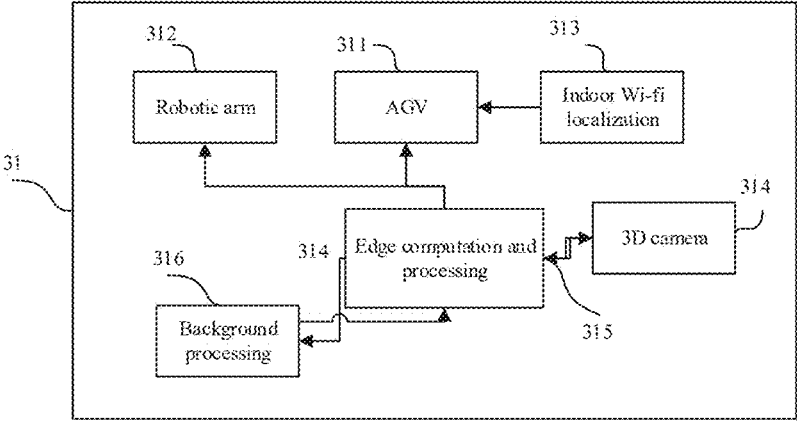
FIG. 9 shows a schematic framework of an example of the store map module, in according with some embodiments of the present disclosure.

FIG. 9 shows a schematic framework of an example of the store map module, in according with some embodiments of the present disclosure. With reference to FIG. 9, in some embodiments, the store map module 31 may include an automated guided vehicle (AGV) 311 which may be also called as a staff robot, a robotic arm 312, an indoor Wi-fi localization module 313, a 3D camera 314, an edge computation and processing module 315, and a background processing module 316. The AGV 311, the robotic arm 312, the 3D camera 314 and the edge computation and processing module 315 together may form a movable machine collaboration platform. The AGV 311 may connect the Wi-fi and Bluetooth at the same time and may achieve GPS function through the indoor Wi-fi localization module 313 which provides an indoor high-accuracy GPS localization. The edge computation and processing module 315 may receive information of the shooting angle of the 3D camera 314 and the pose angle, control the AGV 311 and the robotic arm 312 to move to the targeted location.

In some embodiments, the self-service retail initialization system 30 may provide an initialization function and method. The initialization method may include the following steps:

(1) placing the AGV 311 in a store and letting it record the current location as the origin of the world coordinate;

(2) designing routes based on computer-vision-based route planning algorithm;

(3) fixing camera angle, constructing the AGV-accessible route map and saving the maps to edge-end and back-end;

(4) sampling for the AGV-accessible route map, wherein the sampling step includes moving the AGV 311 to the target location; controlling its robotic arm 312 to scan the surrounding shelves; saving RGBD images while reconstructing the 3D model of the shelves; sending the RGBD images to backend; and sending the camera internal and external parameters to backend; and wherein by now, the construction of the assessable route map and the collection of initialized data have been completed;

(5) back-end receiving world coordinates and RGBD images from edge-end;

(6) detecting the 2D coordinates of the merchandise, searching and classifying the merchandise, by the merchandise detection and classification module;

(7) calculating the locating area in world coordinate based on the 2D coordinates and the internal and external parameter setting of the camera; and (8) saving the 3D coordinates of the merchandise to the merchandise map.

Through the above steps, the merchandise shelves map has initialized. These steps and their order are illustrated as an example. People skilled in the art may add or reduce these steps pr adjust the order according to practical needs.

While particular embodiments have been described, alternatives, modifications, variations, improvements, and substantial equivalents that are or may be presently unforeseen may arise to applicants or skilled in the art. Accordingly, the appended claims as filed and as they may be amended, are intended to embrace all such alternatives, modifications variations, improvements, and substantial equivalents.

What is claimed is:

1. A management and security alert system used in a retail store comprising a first store management and anti-theft subsystem, wherein the first store management and anti-theft subsystem comprises:

a merchandise status monitoring module for monitoring in real time whether any merchandise leaves a shelf in the retail store, locating the merchandise leaving the shelf, based on a live video stream captured by cameras in the retail store, and recording the merchandise leaving the shelf as an off-shelf merchandise;

a Re-id human detecting and tracking module for detecting in real time whether there is a new customer entering the retail store, assigning every new customer with a unique ID number and assigning the off-shelf merchandise to the ID number of the customer who has the closest distance from the off-shelf merchandise;

a merchandise detecting and tracking module for detecting all shelves of the retail store to determine a stock in the retail store and checking the status and locations of all the merchandise in the retail store in real time;

a merchandise classification and search module for receiving the result of the stock detected by the merchandise detecting and tracking module, searching a category for each commodity contained in the stock and classifying the commodity with the category;

an on-shelf merchandise data stack for storing the on-shelf merchandise data and being updated with the current status of the commodity sent from the merchandise classification and search module, wherein when a new customer is entering the retail store, the on-shelf merchandise data stack will be locked and postpone its update; and an alarm generating module for sending out an alert when the Re-id human detecting and tracking module detects that a customer in the retail store approaches a store exit and there is unpaid merchandise recorded under his/her ID number.

2. The management and security alert system used in a retail store according to claim 1, wherein the first store management and anti-theft subsystem further comprises:

an off-shelf merchandise data stack for storing the off-shelf merchandise data and being updated with information of the merchandise leaving the shelf sent by the merchandise status monitoring module.

3. The management and security alert system used in a retail store according to claim 2, wherein both the on-shelf merchandise data stack and the off-shelf merchandise data stack are configured to be updated with a returned merchandise, when the merchandise detecting and tracking module tracks any returned merchandise to the shelf in the retail store and the category of the returned merchandise matches the information of the corresponding merchandise stored in the off-shelf merchandise data stack.

4. The management and security alert system used in a retail store according to claim 2, wherein the off-shelf merchandise data stack is configured to be updated with a checked-out merchandise which is marked as "transaction complete" when a customer reaches a counter and checks out all the merchandise under his/her ID number.

5. The management and security alert system used in a retail store according to claim 1, wherein the closest distance from the off-shelf merchandise is determined based on a Hungarian algorithm.

6. The management and security alert system used in a retail store according to claim 1, wherein the Re-id human detecting and tracking module uses an algorithm of object tracking-by-detection to detect and track in-store customers.

7. The management and security alert system used in a retail store according to claim 1, wherein the management and security alert system further comprises a second store management and anti-theft subsystem for detecting and recognizing suspicious behaviors of customers in the retail store, based on a stick-figure-based human detection technology.

8. The management and security alert system used in a retail store according to claim 7, wherein the second store management and anti-theft subsystem is configured to implement a training acceleration mechanism using a function Y′ of matrices multiplication and Einstein Summation:

$$Y'=\mathrm{einsum}(NVUk,NCTVk{\rightarrow}NCTUk,A',X)$$

where A is an adjacency matrix, A′ is N copies of A, and X is an input vector.

9. The management and security alert system used in a retail store according to claim 7, wherein the second store management and anti-theft subsystem comprises:

a video capture module for capturing live video streams in the retail store;

a human pose estimation module for predicting and estimating human behaviors based on the captured live video streams, using convolutional neural networks;

a suspicious behavior detection and recognition module for detecting and recognizing suspicious behaviors based on the predicted and estimated human behaviors; and an anti-theft alert module for setting out alerts when suspicious behaviors are recognized.

10. The management and security alert system used in a retail store according to claim 9, wherein the human pose estimation module is configured to separate the captured live video streams into a list of images, pre-process the images, extract features of joint keypoints of a customer by inputting the pre-processed images into a convolutional neural network algorithm, use the extracted features of joint keypoints to reconstruct a human body pose, and predict and/or estimate every customer's pose and behavior information based on the reconstructed human body pose.

11. The management and security alert system used in a retail store according to claim 10, wherein the suspicious behavior detection and recognition module is configured to track movement of hands of a customer in the retail store and predict whether the customer is taking or trying to hide an object, based on the pose and behavior information output by the human pose estimation module.

12. The management and security alert system used in a retail store according to claim 9, wherein the suspicious behavior detection and recognition module is configured to use deep learning algorithms of graph convolution neural network to predict and recognize human activities.

13. The management and security alert system used in a retail store according to claim 9, wherein the convolutional neural networks includes OpenPose, PoseNet, ResNet-50, and Darknet53.

14. The management and security alert system used in a retail store according to claim 9, wherein the suspicious behavior detection and recognition module comprises:

a feature extraction module for using a neural-network-based pose estimation model to obtain behavior information of a customer in the retail store;

a suspicious behavior detection recognition module for recognizing and classifying behaviors of the customer based on the obtained behavior information;

a static timing analysis module for obtaining a sequence of timed data/information relating to the customer in the retail store and sorting out a chronological order of several events and correlations of the several events; and a suspicious behavior decision module for receiving the result from the static timing analysis module to analyze and predict an "intention score" of the customer, wherein when the "intention score" exceeds a default threshold valve, the anti-theft alert will set out an alert.

* * * * *